No. 864,914. PATENTED SEPT. 3, 1907.
J. & A. RAAB.
SPRING EQUALIZER.
APPLICATION FILED JAN. 16, 1906.
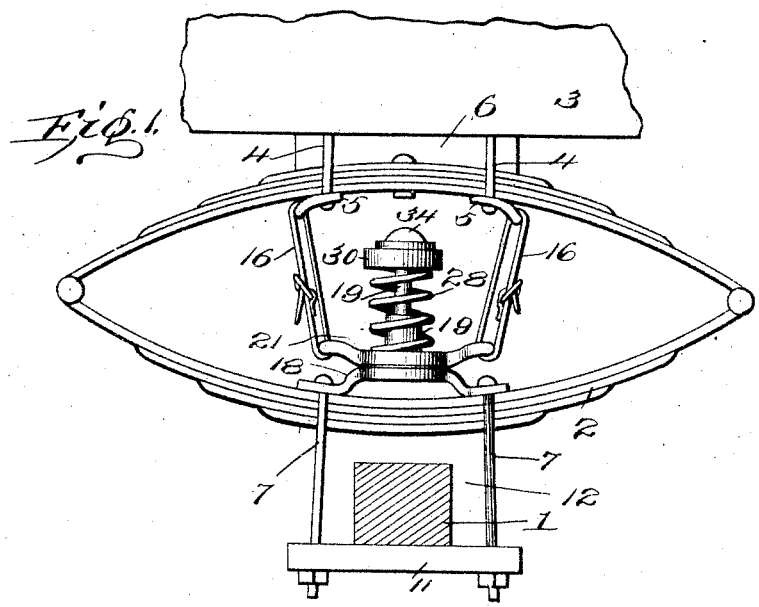
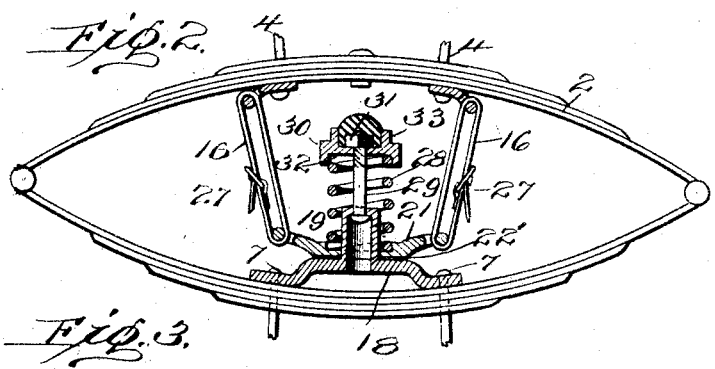
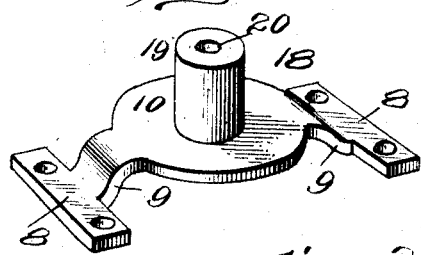
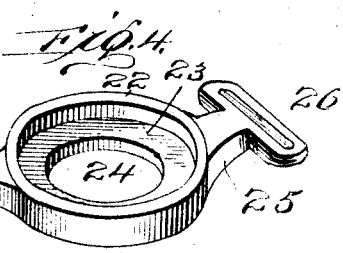
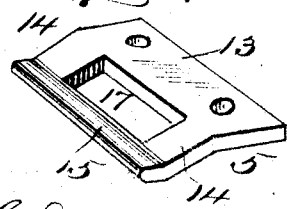
Witnesses
Inventors
John Raab and
Andrew Raab
By Mason, Fenwick Lawrence
Attorneys

UNITED STATES PATENT OFFICE.

JOHN RAAB AND ANDREW RAAB, OF TACOMA, WASHINGTON.

SPRING-EQUALIZER.

No. 864,914.　　　　　Specification of Letters Patent.　　　　　Patented Sept. 3, 1907.

Application filed January 16, 1906. Serial No. 296,372.

*To all whom it may concern:*

Be it known that we, JOHN RAAB and ANDREW RAAB, citizens of the United States, residing at Tacoma, in the county of Pierce and State of Washington, have invented certain new and useful Improvements in Spring-Equalizers; and we do hereby declare the following to be a full, clear, and exact description of the invention, such as will enable others skilled in the art to which it appertains to make and use the same.

This invention relates to improvements in spring equalizers.

The object of the invention is the construction of a spring equalizer which will prevent injury to the primary spring upon the contraction or expansion of the same.

With this and other objects in view, the invention consists of certain other novel constructions, combinations, and arrangements of parts, as will be hereinafter fully described, illustrated in the accompanying drawings, and more particularly pointed out in the claims hereto appended.

In the drawings: Figure 1 is a fragmentary view of a vehicle, showing in side elevation a device constructed in accordance with the present invention. Fig. 2 is a view partly in section and side elevation of a device constructed in accordance with the present invention. Fig. 3 is a perspective view of the primary stationary member, employed in constructing my spring equalizer. Fig. 4 is a perspective view of a vertically movable, auxiliary member employed in constructing my spring equalizer. Fig. 5 is a perspective view of one of the strap-engaging plates.

Referring to the drawings by numerals, 1 designates an ordinary axle upon which is mounted a primary spring 2, preferably an elliptical or elongated spring. A vehicle body 3 is secured to the spring 2 by means of bolt 4; said bolts 4 passing through strap-engaging plates 5 and on each side of a transverse beam or support 6, upon which rests the body 3 of the vehicle. The spring 2 is secured to the axle 1, preferably by means of bolts 7, 7, which pass through the flat, parallel extensions 8, 8 of the feet 9 of the base plate 10. The bolts 7 also pass through an ordinary axle-engaging plate 11. A spring-engaging block 12 is preferably interposed between axle 1 and spring 2. The axle 1 and block 12 constitute a support upon which is mounted and to which is secured spring 2. The strap-engaging plates 5 are likewise secured to a support, which is, in this instance, said transverse plate or member 6 that engages the vehicle body 3. Each of the strap-engaging plates comprises a flat, apertured body portion 13, which is provided with downwardly inclined, parallel extensions 14, 14. Integral with and extending transversely of said extensions 14 is a bar 15, which is preferably substantially oval-shaped in cross-section for permitting a strap 16 to be positioned over said bar 15 without cutting or injuring the same, as would be the case if the bar was not beveled or rounded at its edges. The strap 16 is threaded through the elongated aperture 17 formed by the base 13, parallel arms or extensions 14, and the outer bar 15. The stationary, primary member 18, Fig. 3, comprises said base plate 10, downwardly curved legs 9, and parallel, integral, flat, apertured extensions 8. Each of said flat extensions or feet is positioned at substantially right-angles to the legs 9. Within the apertures of the extensions or feet 8, said bolts 7 are positioned, Figs. 1 and 2. Integral with the base 10 is a hollow post 19, which is partially closed at its upper end, terminating in an aperture 20.

A removable, auxiliary member 21 is positioned upon the post 19, but is preferably separated from the base 10 of the primary member 18 by means of a flexible washer 22', which is preferably formed of leather or any analogous material. The member 21 comprises an annular body 22, which is formed with a socket or seat 23 and with a central aperture 24. Laterally extending arms 25, 25 are formed upon the body 22. Eyes 26 are formed on the outer ends of the arms 25. The strap 16 connects the eyes 26 and the strap-engaging plates 5. Each of these straps is of ordinary type, and through the medium of the buckles 27, they may be adjusted for taking up any slack.

A coiled spring 28 is positioned around the hollow or tubular post 19, and the lower end of said spring 28 is seated within the seat 23 of the vertically slidable member 21. A removable bolt 29 is positioned upon the post 19. The shank of the bolt 29 extends through the aperture 20 of the post, and the head of said bolt is normally within the post 19. The upper or threaded end of the bolt 29 extends through the central portion of cap 30. The cap 30 is securely retained upon the bolt by means of nut 31.

The cap 30 is provided with a lower seat 32 and an upper seat 33. The lower seat 32 is preferably of the same dimensions as the similar seat 23, as the upper end of the coiled spring 28 is positioned within the seat 32, while its lower end is positioned within the seat 23 of the slidable member 21. The upper seat 33 of cap 30, not only has the nut seated therein, but a buffer 34 is seated within this portion of the cap. The buffer or lug 34 is preferably formed of rubber or any analogous material.

When the springs of a vehicle (which springs may be elliptical shaped) are compressed or contracted, by the vehicle running into a rut, the springs in returning to their normal position are subjected to a violent action, that, if not taken up by some auxiliary means, is likely to break or injure the springs. With my structure, when the primary springs 2 are compressed a contracted, the same engages the buffers or lugs 34 forcing the caps downward and thereby compressing coiled springs 28. The spring 28 will permit the expansion of its coöperating spring 2, after it has been compressed, until the spring 2 has passed beyond its normal position, when the recoil of the primary or elliptical spring 2 will be arrested, as the expanding action of said spring 2 will be taken up in the contracting or compressing of the coiled spring 28 through the medium of the straps 16 and the slidable auxiliary member 21. It will be noted that after the primary spring has been expanded to its normal position, additional expansion of said spring will compress or contract the auxiliary spring whereby the action of said primary spring is equalized sufficiently to prevent any injury to the spring or vehicle carried thereby. When a wagon or any other vehicle employing my invention is loaded, the straps 16 will be loosened as the elliptical or primary spring is forced down.

The auxiliary spring 28 stops the recoil of the primary or elliptical spring 2 by reason of the straps being attached below said spring 28 to the slidable member 21. It is to be noted that spring 28 does not exert power by expansion, as it never expands beyond the normal. Its power is always created by contraction, whether the motion of the elliptical or primary spring 2 be upward or downward. By compressing or contracting the primary spring 2, the upper portion of the same will be caused to engage buffer 34, and, consequently, compressing spring 28; after the primary spring has passed its normal position, the spring 28 will be compressed, through the medium of the straps 16 and the member 21. The equalizing of the action of the primary spring 2 is caused by the compression of said spring 28 whether the spring 2 is compressed or expanded.

What I claim is:

1. In a device of the character described, the combination with a support, of an elliptical spring carried by said support, a stationary member provided with a hollow post, carried by the lower portion of said elliptical spring, a reciprocating member adapted to reciprocate in said post, a slidable member positioned upon said stationary member and surrounding said post, a coiled spring positioned upon said slidable member and surrounding said post and reciprocating member, fastening means for securing said coiled spring upon said post and reciprocating means, and means connecting the upper portion of said elliptical spring and said slidable member.

2. In a device of the character described, the combination of a primary spring provided with upper and lower portions, a stationary member provided with a post, engaging the lower portion of said primary spring, a vertically movable member engaging said post, yielding means surrounding said post and engaging said movable member, a hollowed out cap for fastening said yielding means upon said post, and flexible means connecting opposite parts of said movable member and the upper portion of said primary spring.

3. In a device of the character described, the combination of an elliptical spring, a stationary member carried by the lower portion of said spring, said stationary member provided with a central, hollow post, a slidable member engaging said post, said slidable member provided with lateral extensions, a yielding member positioned around said post and engaging said slidable member, a bolt positioned within said post and extending between said yielding member, a cap secured upon the upper end of said bolt and engaging the upper end of said yielding member, and means connecting the upper portion of said spring and the lateral extensions of said slidable member.

4. In a device of the character described, the combination of an elliptical spring, a vertically movable member positioned between the upper and lower portions of said spring, said member comprising an annular body provided with a seat, said member provided with lateral extensions, each extension provided with an eye upon its outer end, means connecting said eyes and upper portion of said spring, and means normally exerting a downward pressure upon said movable member.

5. In a device of the character described, the combination of an elliptical spring, a stationary member engaging the lower portion of said spring, a movable member provided with lateral extensions, carried by said stationary member, a cap, means connecting said cap to said stationary member, yielding means interposed between said cap and said movable member, and means adjustably connecting said lateral extensions and the upper portion of said elliptical springs.

6. In a device of the character described, the combination of an elliptical spring, a stationary member provided with a post, carried by the lower portion of said spring, a slidable member positioned upon said post, a cap, means connecting said cap to said post, a buffer carried by said cap, and means connecting the upper portion of said spring and slidable member.

7. In a device of the character described, the combination of a primary spring comprising upper and lower portions, a cap interposed between the upper and lower portions of the said primary spring, yielding means carried by the upper portion of said cap, yielding means positioned beneath said cap, and means connecting the upper portion of said spring and the lower portion of the yielding means positioned beneath the cap.

In testimony whereof we affix our signatures in presence of two witnesses.

JOHN RAAB.
ANDREW RAAB.

Witnesses:
EMIL U. STENBERG,
R. H. LUND.